Sept. 7, 1948.  M. F. COSTA  2,448,863
ICE CREAM DIPPER
Filed May 11, 1946
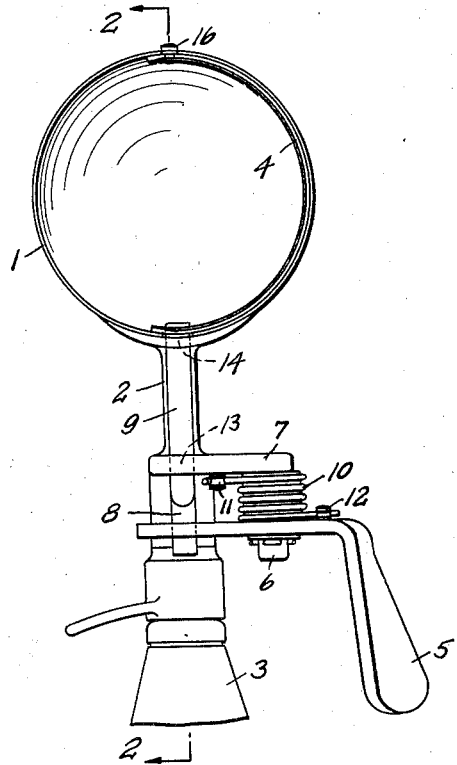
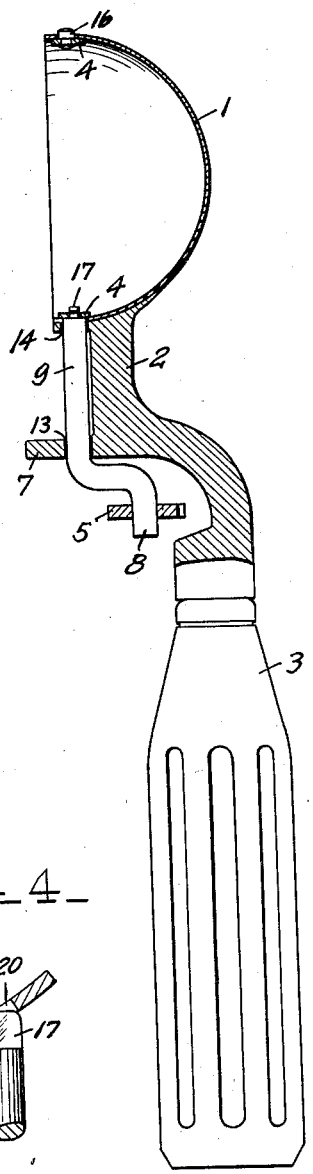
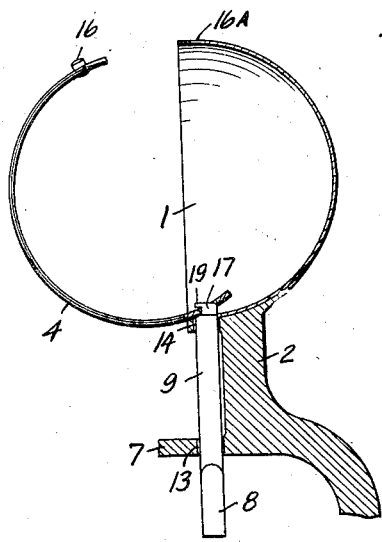
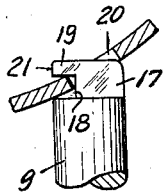
INVENTOR:
Mannie F. Costa,
BY
Bodell & Thompson
ATTORNEYS.

Patented Sept. 7, 1948

2,448,863

UNITED STATES PATENT OFFICE 2,448,863

ICE-CREAM DIPPER

Mannie F. Costa, Syracuse, N. Y., assignor to T. N. Benedict Mfg. Co., East Syracuse, N. Y., a corporation of New York Application May 11, 1946, Serial No. 669,085

1 Claim. (Cl. 107—48)

This invention relates to ice cream dippers and the like used not only for dipping and measuring ice cream but also other foods, as mashed potatoes, etc., of the type shown in the Phillips Patent No. 1,774,154 issued August 26, 1930. In this type of dipper, the bowl shaped scraper which moves in a substantially semispherical bowl is actuated by and secured to one end of a rock shaft journalled in bearings spaced apart axially of the shank to which the bowl is attached, the shaft heretofore having been permanently fixed or riveted to the end of the scraper.

The invention has for its object detachably securing the scraper and the shaft together, whereby not only are the scraper and shaft more easily assembled but also may be instantly removed for the purpose of cleaning, etc.

The invention further has for its object a particularly simple and efficient coupling or joint between the shaft and one end of the scraper.

The invention consists in the novel features and in the combinations and constructions hereinafter set forth and claimed.

In describing this invention, reference is had to the accompanying drawings, in which like characters designate corresponding parts in all the views.

Figure 1 is a face view looking into the bowl of the dipper, the handle being broken away.

Figure 2 is a sectional view taken on the plane of line 2—2, Figure 1.

Figure 3 is a fragmentary sectional view showing the method of assembling and also the method of demounting the scraper from the end of the shaft.

Figure 4 is an enlarged view of the end of the shaft, the adjacent end of the scraper and the means for detachably coupling them together, the scraper being shown in section.

1 designates the bowl, which has a radially extending shank 2 on which a handle 3 is mounted. 4 is an arcuate or semi-circular scraper mounted to swing into the bowl, and pivoted at diametrically opposite points in the rim of the bowl. The actuating mechanism for the scraper is the same as in the Phillips Patent No. 1,774,154, referred to, and includes a thumb lever 5 mounted on a stud 6 projecting from a bracket 7 on the shank 2, the stud extending parallel to the shank, the lever having a slot therein, as in the Phillips patent, for receiving the crank 8 on the scraper shaft 9 on one end of which the scraper 4 is mounted. The thumb lever 5 is biased in one direction to return it to starting position by a coil spring 10 around the stud and detachably anchored at one end at 11 to a lug on the bracket 7 and its other end at 12 on a lug on the lever. In the type of the Phillips patent, the scraper is permanently secured, as by riveting, to the end of the shaft 9, and hence the shaft 9 is not demountable from its bearing without undoing the rivet. In some dippers, the shaft and the scraper are removable as a unit by mounting the shaft in bearings over at one side, as in Whiteside Patent No. 1,675,776 issued July 3, 1928. In either case, the permanent securing of the shaft and the spring together is relatively costly and also disadvantageous, both in so far as assembling and demounting are concerned.

The invention includes means by which one end of the scraper and the adjacent end of the scraper shaft are detachably interlocked upon tilting movement of the scraper about the end of the shaft when the trunnion is out of its bearing, into a position in which the trunnion is alined with its bearing. When the trunnion is alined with its bearing, it is snapped into its bearing upon the resetting of the bow shaped scraper.

13 and 14 designate bearings in the shank for the shaft 9, the bearing 14 opening into the bowl at the rim thereof. 16 designates the trunnion on the opposite end of the scraper for entering an opening or bearing in the rim of the bowl.

In the illustrated embodiment of the invention, the shaft 9 is formed with a reduced portion 17 as a diametrically extending rib at the end thereof adjacent the bowl, this rib being formed with a notch 18 providing a shoulder 19 overhanging the end surface of the shaft from which the rib 17 extends, and the adjacent end of the scraper is formed with a slot 20 of the width of the rib 17 but of a length approximately the same as the distance between the bottom of the notch 18 and the opposite end face of the rib, this end face being substantially flush with the peripheral surface of the shaft 9. Also, the end surface 21 of the overhanging shoulder 19 is flush with the periphery of the shaft 9.

Owing to this construction, with the trunnion 16 detached, as in Figure 3, the end of the scraper 4 to be attached to the shaft 9 is interlocked in the notch 18, while the scraper is tilted, as in Figures 3 and 4, so that the shoulder 19 extends through one end of the slot 20 while the other end of the rib 17 is out of the slot 20. The slot is of such length and the notch 18 of such depth that when the parts are in the position shown in Figure 4, the slot will fit over the end of the rib 17 upon tilting movement of the scraper into such position as trunnion 16 alines with its bearing 16A. When so alined, the trunnion snaps into the bearing, due to the resiliency of the arcuate or bow shaped scraper 4. When the scraper is so interlocked with the shaft, there is extremely little looseness or chucking of the slotted end of the scraper relatively to the shaft 9, so that the scraper is as securely fastened to the shaft 9 as if riveted thereto, and at the same time, can the scraper be quickly assembled on the shaft but also readily demounted by the reverse of the movements employed for assembling it.

What I claim is:

In an ice cream dipper and the like which includes a substantially semi-spherical bowl, a shank projecting radially from the rim of the bowl, a handle on the shank, an arcuate scraper mounted in the bowl and means for actuating the scraper including a rock shaft journalled in bearings in the shank, one of which bearings opens into the bowl at the rim thereof, the scraper being mounted at one end on the shaft, the scraper being resilient and having a trunnion for entering a bearing in the bowl diametrically opposite the end of the shaft; the combination of said shaft being formed with a rib at its end projecting into the bowl, the rib having a notch in one end providing a shoulder located within the diameter of the shaft, and the end of the scraper adjacent the end of the shaft formed with a slot for receiving said rib appoximately as long as the distance from the bottom of the notch to the opposite end surface of the rib, whereby the slot receives the rib and interlocks in the notch upon tilting movement of the scraper about the end of the shaft when the trunnion is out of its bearing into position where the trunnion is alined with its bearing.

MANNIE F. COSTA.

REFERENCES CITED

The following references are of record in the file of this patent:

UNITED STATES PATENTS

| Number | Name | Date |
|--------|------|------|
| 968,945 | Hogan | Aug. 30, 1910 |
| 1,774,154 | Phillips | Aug. 26, 1930 |
| 1,847,328 | Berzon | Mar. 1, 1932 |
| 1,857,685 | Friedman | May 10, 1932 |